United States Patent
Ide et al.

(10) Patent No.: US 9,077,279 B2
(45) Date of Patent: Jul. 7, 2015

(54) LOAD DRIVE CONTROL SYSTEM FOR HYBRID VEHICLE AND METHOD OF CONTROLLING HYBRID VEHICLE

(71) Applicant: HONDA MOTOR CO., LTD., Tokyo (JP)

(72) Inventors: Hirohito Ide, Wako (JP); Daisuke Hoshino, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 104 days.

(21) Appl. No.: 14/078,537

(22) Filed: Nov. 13, 2013

(65) Prior Publication Data

US 2014/0167663 A1    Jun. 19, 2014

(30) Foreign Application Priority Data

Dec. 18, 2012  (JP) ................. 2012-276137

(51) Int. Cl.
  *H02P 21/00*    (2006.01)
  *H02P 21/14*    (2006.01)
  *H02P 6/18*    (2006.01)

(52) U.S. Cl.
  CPC .............. *H02P 21/146* (2013.01); *H02P 6/182* (2013.01)

(58) Field of Classification Search
  CPC ..................................... H02P 1/18; H02P 3/08
  USPC ............. 318/400.01, 400.02, 400.14, 400.15, 318/432, 587, 632, 638, 715, 721, 722, 725, 318/727, 779, 799, 800, 801, 805, 811, 812, 318/437, 459, 504; 388/800, 819, 806, 822
  See application file for complete search history.

(56) References Cited

U.S. PATENT DOCUMENTS 6,984,957 B2 *  1/2006  Tajima et al. ............ 318/400.02
7,701,156 B2 *  4/2010  Okamura ...................... 318/255
8,207,694 B2 *  6/2012  Izumi et al. .............. 318/400.04

FOREIGN PATENT DOCUMENTS

JP      06-165561      6/1994

* cited by examiner

*Primary Examiner* — Antony M Paul
(74) *Attorney, Agent, or Firm* — Mori & Ward, LLP (57) ABSTRACT

A load drive control system for a hybrid vehicle includes a zero current control execution device and an error compensating device. The zero current control execution device is configured to control a converter to output a substantially constant raised voltage that is higher than an inductive voltage generated in an electric motor. The error compensating device is configured to compensate for an attachment error of a first position detector based on a d-axis voltage command value for the electric motor calculated during zero current control.

12 Claims, 11 Drawing Sheets

$Vq* = E\cos\theta, Vd* = E\sin\theta$

LOAD DRIVE CONTROL SYSTEM FOR HYBRID VEHICLE AND METHOD OF CONTROLLING HYBRID VEHICLE

CROSS-REFERENCE TO RELATED APPLICATIONS

The present application claims priority under 35 U.S.C. §119 to Japanese Patent Application No. 2012-276137, filed Dec. 18, 2012, entitled "Load Drive Control System." The contents of this application are incorporated herein by reference in their entirety.

BACKGROUND

1. Field

The present disclosure relates to a load drive control system for a hybrid vehicle and to a method of controlling the hybrid vehicle.

2. Description of the Related Art

Japanese Unexamined Patent Application Publication No. 6-165561 describes a control system that detects the position of a rotor of a synchronous electric motor to perform vector control and automatically corrects positional shift of the rotor if positional shift occurs. The control system includes a voltage detecting unit for detecting a d-axis voltage of the synchronous electric motor and a position calculating unit for detecting periods of no load from an electrical current of the synchronous electric motor and outputting a position signal after correcting the position of the rotor using the d-axis voltage at no load.

SUMMARY

According to one aspect of the present invention, a load drive control system for a hybrid vehicle includes a zero current control execution device and an error compensating device. The zero current control execution device is configured to perform zero current control in which a rotor of an electric motor which serves as a drive source of the hybrid vehicle is rotated under no load condition if the hybrid vehicle travels using a driving force from only an internal-combustion engine which serves as a drive source of the hybrid vehicle. The hybrid vehicle includes a converter and an inverter. The converter is configured to raise a DC voltage output from an electricity storage device configured to supply electricity to the electric motor. The inverter is configured to convert an output voltage of the converter into an AC voltage and to apply the AC voltage to the electric motor. The zero current control execution device is configured to control the converter to output a substantially constant raised voltage that is higher than an inductive voltage generated in the electric motor. The error compensating device is configured to compensate for an attachment error of a first position detector based on a d-axis voltage command value for the electric motor calculated during the zero current control. The first position detector is configured to detect a rotational position of the rotor of the electric motor.

According to another aspect of the present invention, in a method of controlling a hybrid vehicle, zero current control is performed. In the zero current control, a rotor of an electric motor which serves as a drive source of the hybrid vehicle is rotated under no load condition if the hybrid vehicle travels using a driving force from only an internal-combustion engine which serves as a drive source of the hybrid vehicle. The converter is controlled to output a substantially constant raised voltage that is higher than an inductive voltage generated in the electric motor. An attachment error of a first position detector is compensated based on a d-axis voltage command value for the electric motor calculated during the zero current control. The first position detector is configured to detect a rotational position of a rotor of the electric motor.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

When normally controlling driving of an electric motor, a drive control system of the electric motor uses the electrical degree that indicates the rotational position of a rotor of the electric motor. To detect the electrical degree of the rotor, the electric motor has a position detector, such as a resolver, attached thereto. However, if an error in the attachment angle of the position detector with respect to the rotor of the electric motor (hereinafter referred to as an "attachment error") occurs, the electrical degree detected by the position detector also has an error (an offset). Thus, it is difficult to highly accurately drive the electric motor. The attachment error occurs when the position detector is attached to the electric motor. In some cases, the attachment error varies over time. Accordingly, the attachment error of the position detector needs to be detected as appropriate.

The attachment error of the position detector is detected when the rotor of the electric motor is rotated by an external force under no load condition. To allow the electric motor to run at no load when the rotor of the electric motor is rotated by an external force, each of a d-axis current command value (Id*) and a q-axis current command value (Iq*) of the electric motor is set to "0". Control of the electric motor performed under conditions in which Id*=0 and Iq*=0 is referred to as "zero current control". To perform zero current control, a voltage for cancelling out the inductive voltage generated in the electric motor is applied to the electric motor.

Figure 11:
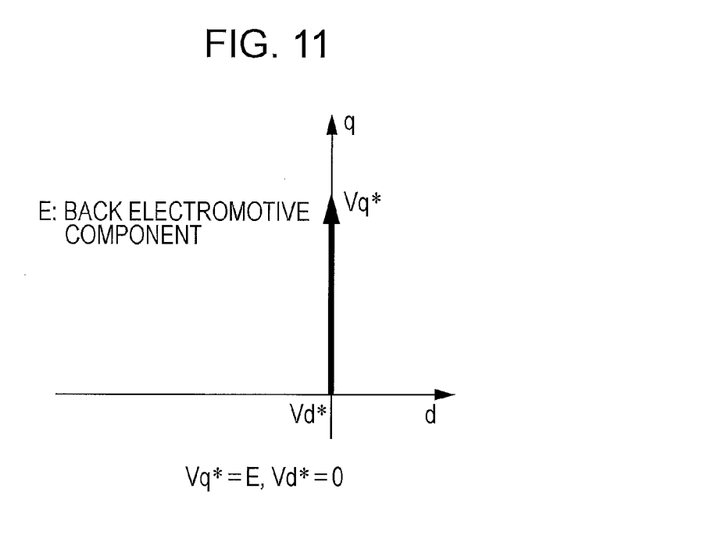
FIG. 11 illustrates d- and q-axis components of a voltage command value when there is no attachment error of a position detector.

If there is no attachment error of the position detector, a voltage command value for canceling out the inductive voltage generated in the electric motor is expressed using only a back electromotive component on the q-axis (Vq*=E). FIG. 11 illustrates d-axis and q-axis components of the voltage command value when there is no attachment error of the position detector. As illustrated in FIG. 11, when there is no attachment error of the position detector and if zero current control is performed, a d-axis voltage command value Vd* can be set to "0" and a q-axis voltage command value Vq* can be set to "E".

Figure 12:
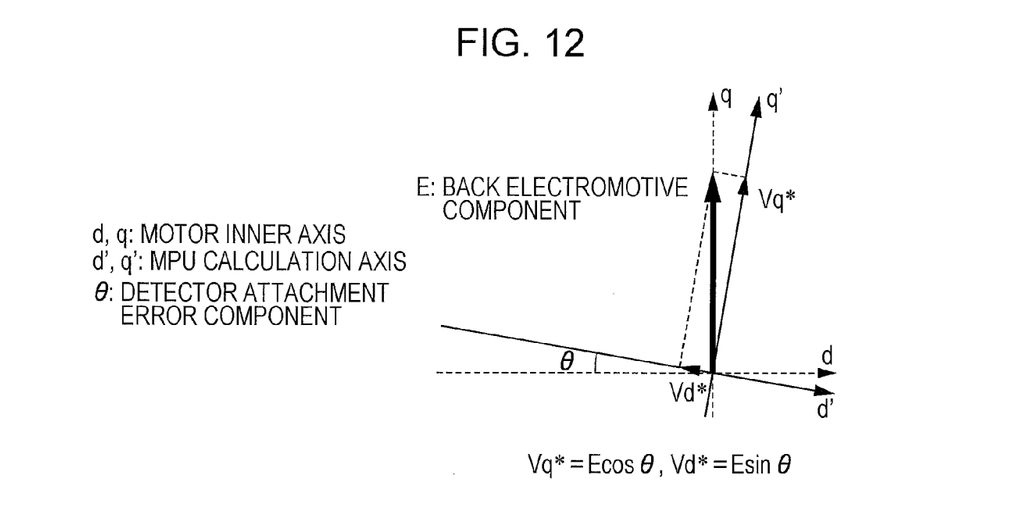
FIG. 12 illustrates an example of d- and q-axis components of a voltage command value when there is an attachment error of a position detector.

In contrast, if there is an attachment error of the position detector, a voltage command value for canceling out the inductive voltage generated in the electric motor is expressed using a d-axis component and a q-axis component of the back electromotive component E. FIG. 12 illustrates an example of d-axis and q-axis components of the voltage command value when there is an attachment error of the position detector. As illustrated in FIG. 12, when there is an attachment error of the position detector and if zero current control is performed, the d-axis voltage command value Vd* needs to be set to "E sin θ" and the q-axis voltage command value Vq* needs to be set to "E cos θ". As described above, if there is an attachment error of the position detector, the voltage command value on the d-axis in accordance with the error component (θ) appears.

When the above-described zero current control is performed and if the interlinkage magnetic flux of the electric motor is strong, the inductive voltage generated in the electric motor is high. If the inductive voltage is higher than a supply voltage of the electric motor, a high-harmonic component is overlapped on even the d-axis voltage command value Vd*, which is a voltage command value for canceling out the inductive voltage. As a result, the accuracy of the d-axis voltage command value Vd* decreases and, therefore, it is difficult to accurately detect the attachment error of the position detector. In addition, since a relationship indicated by "inductive voltage V=interlinkage magnetic flux φ·electric angular velocity ω" holds for this case, the interlinkage magnetic flux φ is strong if the temperature of a magnet that constitutes the armature of the electric motor is low. Accordingly, if the inductive voltage varies in accordance with the temperature of the magnet and, thus, the accuracy of the d-axis voltage command value Vd* decreases, the attachment error of the position detector cannot be accurately detected.

Accordingly, the embodiments of the present application provide a load drive control system capable of accurately compensating for an error in the angle of a position detector for detecting the rotational position of a rotor of the electric motor with respect to the rotor.

The embodiments will now be described with reference to the accompanying drawings, wherein like reference numerals designate corresponding or identical elements throughout the various drawings.

Note that the following load drive control systems of the exemplary embodiments are mounted in a vehicle, such as a hybrid electrical vehicle (HEV).

An HEV includes an electric motor and an internal-combustion engine. The HEV travels using a driving force of the electric motor and/or the internal-combustion engine depending on the drive condition of the vehicle. In General, HEVs can be classified into series and parallel HEVs. Series HEVs travel by a driving force of the electric motor. The internal-combustion engine is used only for generation of electricity. The electricity generated by a generator using the power of the internal-combustion engine is stored in a electricity storage unit, or is supplied to the electric motor.

There are two types of series HEV drive mode. One is an EV drive mode and the other is an ECVT drive mode. In the EV drive mode, HEVs travel using a driving force of the electric motor driven by the electric power supplied from a electricity storage unit. At that time, the internal-combustion engine is not driven. In contrast, in the ECVT drive mode, HEVs travel using a driving force of the electric motor driven by the electric power supplied from both the electricity storage unit and generator or the electric power supplied only from the generator. At that time, the internal-combustion engine is driven to generate electricity in the generator.

Parallel HEVs travel by a driving force of either the electric motor, the internal-combustion engine, or the both. In particular, a drive mode in which parallel HEVs travel by a driving force of only the internal-combustion engine is referred to as an "overdrive (OD) drive mode".

In addition, series-parallel HEVs having the functions of both the Series HEV and the Parallel HEV have been developed. In series-parallel HEVs, a driving force transfer line is switched to a series configuration or a parallel configuration by disengaging or engaging (disconnecting or connecting) a clutch in accordance with a travel condition. In particular, when the HEV travels with acceleration at low to medium speed, the clutch is disengaged and, thus, the HEV has the series configuration. In contrast, in a normal drive mode at a medium to high speed (in cruise travelling), the clutch is engaged and, thus, the HEV has the parallel configuration.

Figure 1:
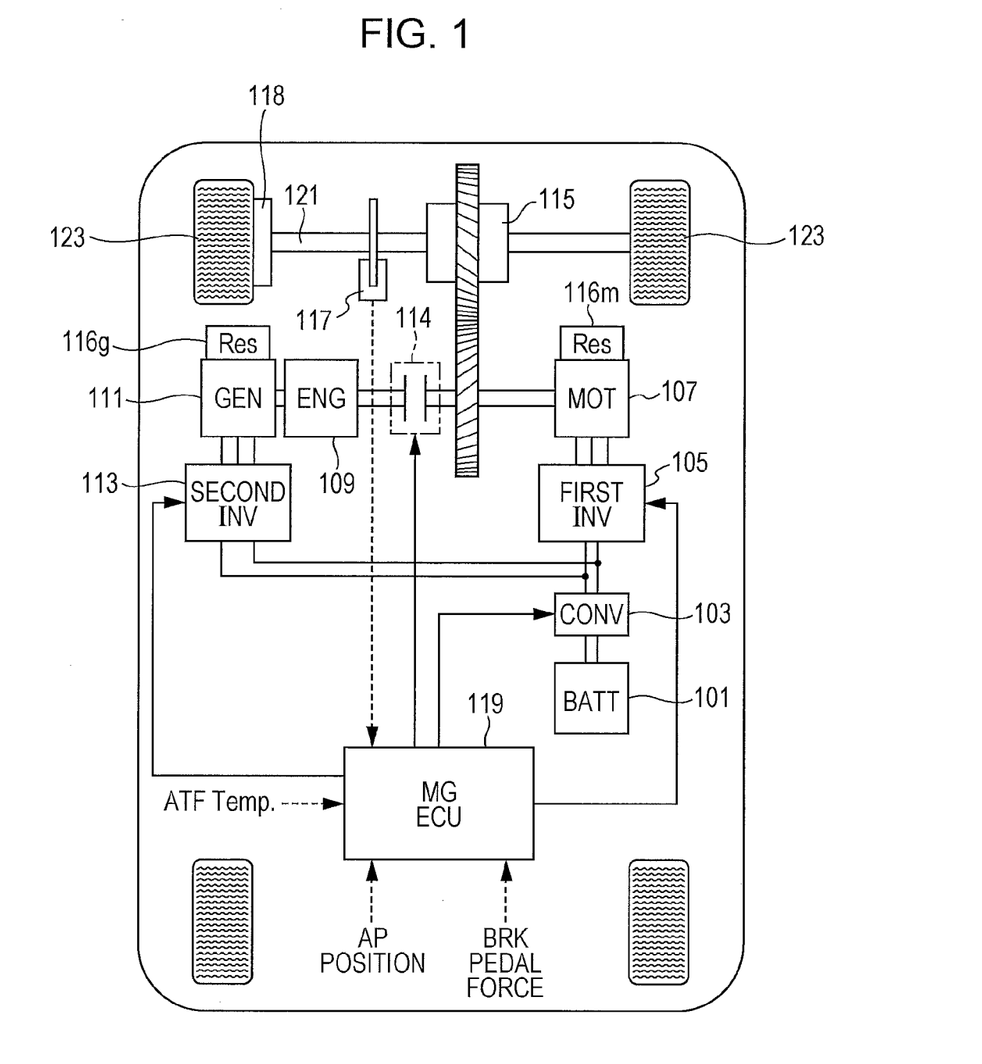
FIG. 1 is a block diagram of the internal configuration of a series-parallel HEV.

FIG. 1 is a block diagram of the internal configuration of a series-parallel HEV. As illustrated in FIG. 1, a series-parallel HEV (hereinafter simply referred to as a "vehicle") includes an electricity storage unit, (BATT) 101, a converter (CONV) 103, a first inverter (first INV) 105, an electric motor (MOT) 107, an internal-combustion engine (ENG) 109, a generator (GEN) 111, a second inverter (second INV) 113, a lock-up clutch (hereinafter simply referred to as a "clutch") 114, a gearbox (hereinafter simply referred to as a "gear") 115, resolvers (Res) 116m and 116g, a vehicle speed sensor 117, a mechanical brake 118, and a management ECU (MG ECU) 119. Note that in FIG. 1, a dotted arrow indicates value data, and a solid arrow indicates a control signal including instruction information.

The electricity storage unit 101 includes a plurality of power storage cells connected in series. The electricity storage unit 101 supplies, for example, a high voltage of 100 V to 200 V. The power storage cell is, for example, a lithium-ion cell or a nickel-hydrogen cell. The converter 103 raises or lowers a DC voltage output from the electricity storage unit 101 to output the raised or lowered DC voltage. The first inverter 105 converts a DC voltage into an AC voltage and supplies three-phase currents to the electric motor 107. In addition, the first inverter 105 converts an AC voltage that is input during a regenerative operation performed by the electric motor 107 into a DC voltage to charge the electricity storage unit 101.

The electric motor 107 generates the power used by the vehicle to move. The torque generated by the electric motor 107 is transferred to a drive wheel 123 via the gear 115 and a drive axle 121. Note that the rotor of the electric motor 107 is directly coupled to the gear 115. In addition, the electric motor 107 operates as a generator in regenerative braking. The electricity generated by the electric motor 107 is stored in the electricity storage unit 101.

If the clutch 114 is disengaged and, thus, the vehicle travels as a series HEV, the internal-combustion engine 109 is used only to drive the generator 111. In contrast, if the clutch 114 is engaged, the output of the internal-combustion engine 109 serves as kinetic energy for driving the vehicle and is transferred to the drive axle 121 via the generator 111, the clutch 114, and the gear 115.

The generator 111 is driven by the power of the internal-combustion engine 109 so as to generate electricity. The electricity generated by the generator 111 is stored in the electricity storage unit 101 or is supplied to the electric motor 107 via the second inverter 113 and the first inverter 105. The second inverter 113 converts the AC voltage generated by the generator 111 to a DC voltage. The electricity converted by the second inverter 113 is stored in the electricity storage unit 101 or is supplied to the electric motor 107 via the first inverter 105.

The clutch 114 connects or disconnects the transfer path of a driving force from the internal-combustion engine 109 to the drive wheel 123 on the basis of an instruction received from the management ECU 119. The gear 115 is, for example, a fixed single gear corresponding to a fifth gear. Accordingly, the gear 115 converts the driving force from the electric motor 107 into the rotational speed and the torque in a particular gear ratio and transfers the rotational speed and the torque to the drive axle 121.

The resolver 116m detects the electrical degree of the rotor of the electric motor 107. The rotational speed of the electric motor 107 can be calculated from a variation of the electrical degree detected by the resolver 116m. The resolver 116g detects the electrical degree of the rotor of the generator 111. The rotational speed of the generator 111 can be calculated from a variation of the electrical degree detected by the resolver 116g. The vehicle speed sensor 117 detects the travel speed of the vehicle (a vehicle speed VP). A signal indicating the vehicle speed VP detected by the vehicle speed sensor 117 is sent to the management ECU 119. The mechanical brake 118 reduces the rotational speed of the drive wheel 123 using a frictional force and, thus, generates a vehicle braking force.

The management ECU 119 engages and disengages the clutch 114, switches between drive modes, and performs control of driving of the electric motor 107, the internal-combustion engine 109, and the generator 111. The management ECU 119 is described in more detail below.

Figure 2:
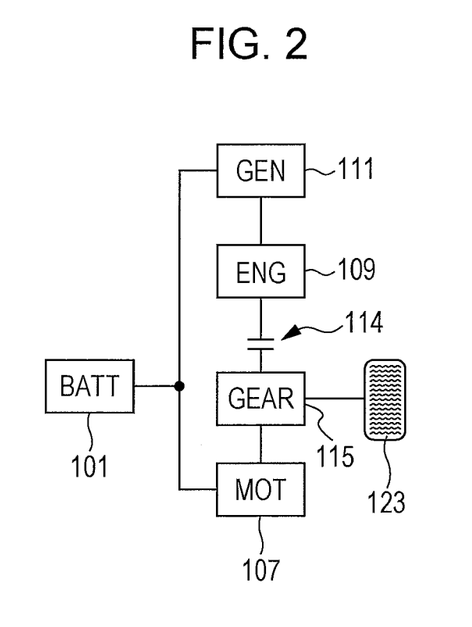
FIG. 2 is a schematic illustration of main parts of a drive system of the vehicle illustrated in FIG. 1.
Figure 3A:
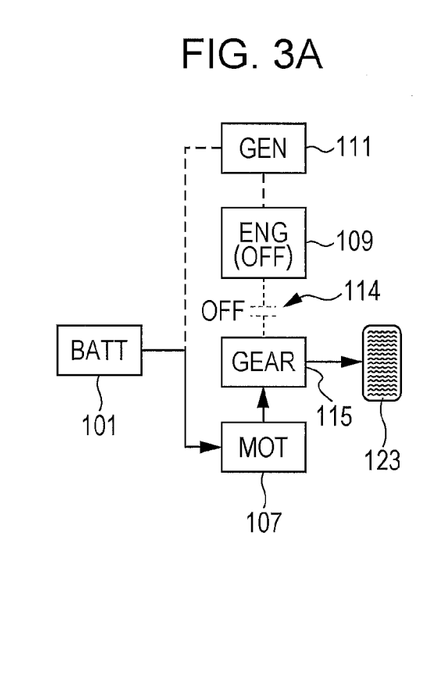
FIG. 3A illustrates the drive conditions of the vehicle in an EV drive mode.
Figure 3B:
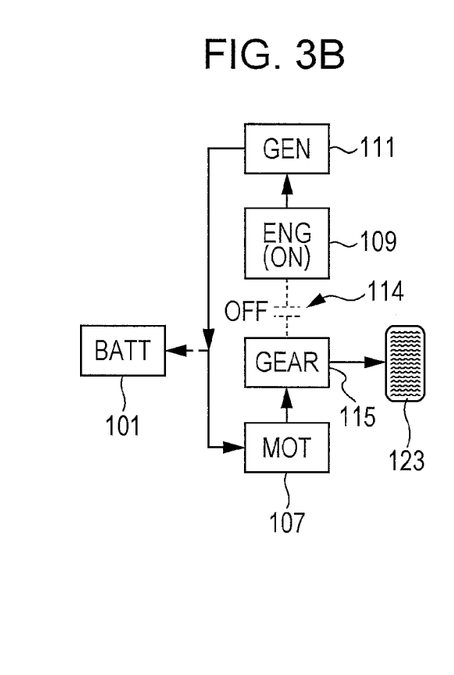
FIG. 3B illustrates the drive conditions of the vehicle in an ECVT drive mode.
Figure 3C:
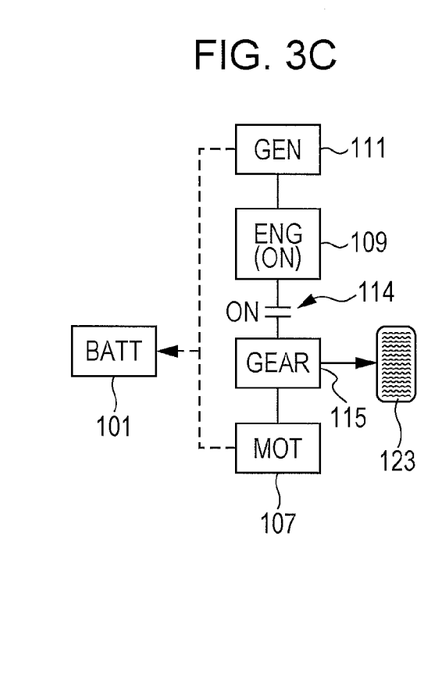
FIG. 3C illustrates the drive conditions of the vehicle in an OD drive mode.

FIG. 2 is a schematic illustration of main parts of a drive system of the vehicle illustrated in FIG. 1. FIG. 3A illustrates the drive conditions of the vehicle in the EV drive mode. FIG. 3B illustrates the drive conditions of the vehicle in the ECVT drive mode. FIG. 3C illustrates the drive conditions of the vehicle in the OD drive mode.

In the vehicle in the EV drive mode, as illustrated in FIG. 3A, the clutch 114 is disengaged, and the internal-combustion engine 109 is stopped. The vehicle travels by a driving force of the electric motor 107 driven by the electric power supplied from the electricity storage unit 101. In the vehicle in the ECVT drive mode, as illustrated in FIG. 3B, the clutch 114 is disengaged, and the internal-combustion engine 109 is started so as to supply electricity that allows the electric motor 107 to deliver the output requested on the basis of, for example, an accelerator pedal position (AP position) and the vehicle speed. The vehicle travels by a driving force of the electric motor 107 driven by the electricity supplied from the generator 111. In the vehicle in the OD drive mode, as illustrated in FIG. 3C, the clutch 114 is engaged, and the vehicle travels by a driving force of the internal-combustion engine 109. When the vehicle is travelling in the OD drive mode, the rotor of the electric motor 107 and the rotor of the generator 111 are caused to rotate by the rotation of the internal-combustion engine 109 that is operating.

During acceleration at low to medium speed, the clutch 114 is disengaged, and the vehicle is set in the EV drive mode or the ECVT drive mode. In contrast, during normal driving (cruise driving) at medium to high speed, the clutch 114 is engaged, and the vehicle is set in the OD drive mode. The setting of a drive mode is made by the management ECU 119 illustrated in FIG. 1 after the management ECU 119 determines a drive phase on the basis of, for example, the accelerator pedal position (AP position) and the vehicle speed. For example, if the drive phase is changed from "start/acceleration travelling" to "medium speed steady travelling", the management ECU 119 engages the clutch 114 and changes the drive mode from the EV drive mode to the OD drive mode.

Figure 4:
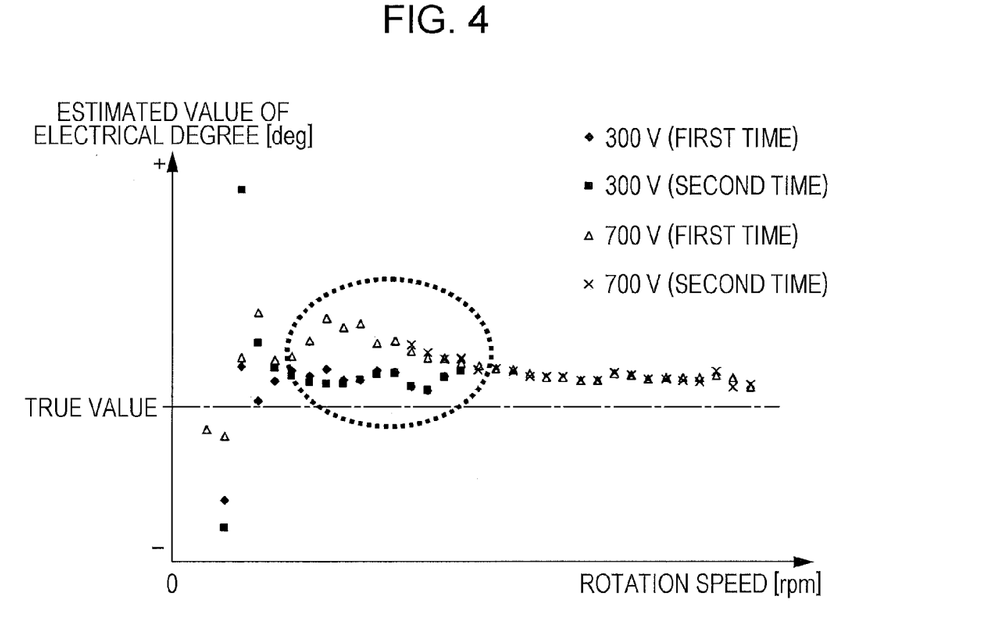
FIG. 4 is a graph indicating a relationship between the rotational speed and an estimated value of an electrical degree when different raised voltages are applied.

When the drive mode of the vehicle is set to the OD drive mode, the management ECU 119 performs zero current control so that the electric motor 107 and the generator 111 are not under load. At that time, the management ECU 119 controls the converter 103 so that the converter 103 outputs a substantially constant raised voltage higher than the inductive voltage generated by the electric motor 107 or the generator 111. The reason why the output voltage of the converter 103 is made constant is that as illustrated in FIG. 4, if the output voltage varies, the estimated value of the electrical degree varies depending on the rotational speed. Furthermore, the management ECU 119 compensates for the attachment errors of the resolvers 116m and 116g attached to the electric motor 107 and the generator 111, respectively, on the basis of the d-axis voltage command values Vd* for the electric motor 107 and the generator 111 calculated during zero current control.

Figure 5:
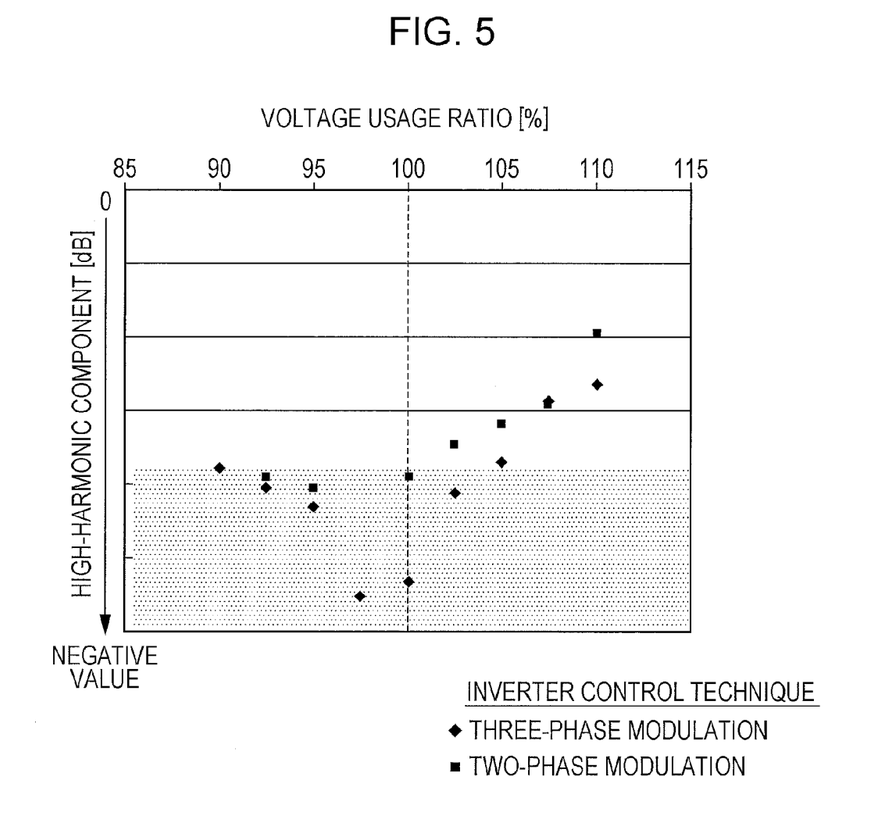
FIG. 5 is a graph indicating a relationship between a voltage usage ratio and a high-harmonic component.

As indicated by the configuration illustrated in FIG. 3C, the vehicle speed of the vehicle travelling in the OD drive mode is proportional to each of the rotational speed of the internal-combustion engine 109, the rotational speed of the electric motor 107, and the rotational speed of the generator 111. In addition, according to the above-described relationship indicated by "inductive voltage V=interlinkage magnetic flux φ·electric angular velocity ω", the inductive voltage V generated while the vehicle is travelling in the OD drive mode increases with increasing vehicle speed. If the management ECU 119 performs zero current control in order to cancel out the inductive voltage that is higher than a raised voltage upper limit of the converter 103, the voltage usage ratio of the load (the electric motor 107 and the generator 111) is higher than 100%. Thus, as illustrated in FIG. 5, the high-harmonic component of the d-axis voltage command value Vd* increases. As a result, the accuracy of error compensation deteriorates. Therefore, according to the present exemplary embodiment, only when the voltage usage ratio is less than or equal to 100%, the zero current control is performed. That is, even when the drive mode of the vehicle is set to the OD drive mode, the management ECU 119 stops the operations of zero current control execution units 201m and 201g if the vehicle speed is so high that the inductive voltage generated in the electric motor 107 or the generator 111 exceeds the raised voltage upper limit of the converter 103 and, thus, the voltage usage ratio exceeds 100%.

Figure 6:
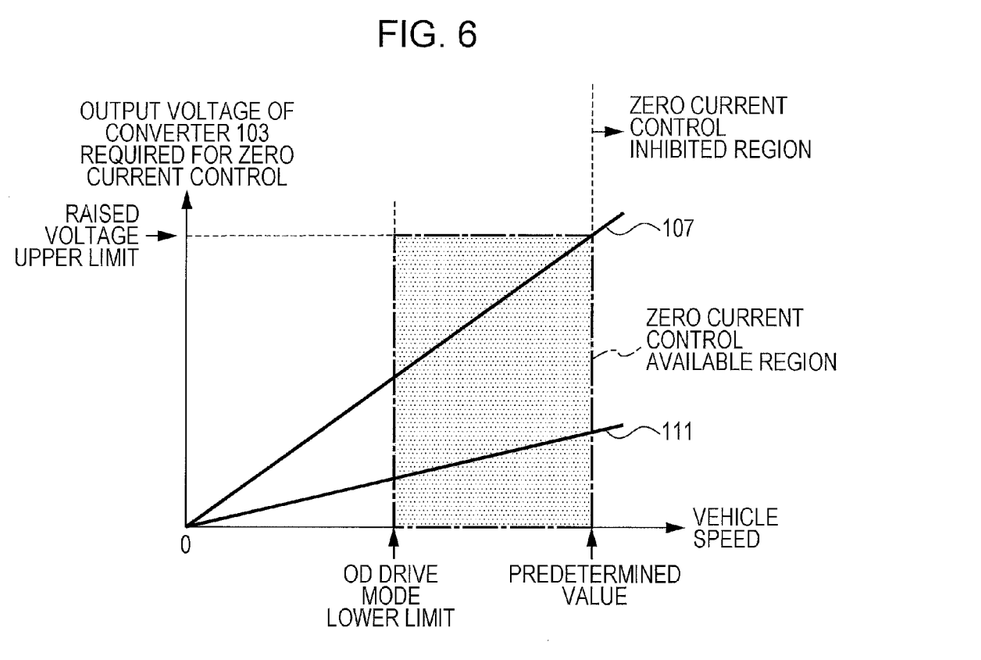
FIG. 6 is a graph indicating a relationship between the output voltage of a converter required for performing zero current control on each of an electric motor and a generator and a vehicle speed.

FIG. 6 is a graph indicating a relationship between the output voltage of the converter 103 required for performing the zero current control on each of the electric motor 107 and the generator 111 and the vehicle speed. As described above, since the OD drive mode is set when the vehicle travels at a constant medium to high speed (in cruise travelling), the lower limit of the vehicle speed for which the OD drive mode can be set (an OD drive mode lower limit) is predetermined. Accordingly, as illustrated in FIG. 6, in order to detect the attachment error of each of the resolvers 116m and 116g, the management ECU 119 performs the zero current control while the vehicle is traveling in the OD drive mode at a vehicle speed in the range from the OD drive mode lower limit to the above-described predetermined value.

In addition, in the above-described relationship "inductive voltage V=interlinkage magnetic flux φ·electric angular velocity ω", the interlinkage magnetic flux φ increases with increasing temperature of a magnet that constitutes the armature. Accordingly, if the temperature of a magnet is low, the inductive voltage is high. Thus, if the temperature of a magnet is lower than a threshold value, the management ECU 119 stops an operation of compensating for the attachment error of each of the resolvers 116m and 116g. Note that the above-described predetermined value, which is the upper limit of the vehicle speed for performing the zero current control when the voltage usage ratio is less than or equal to 100%, may be a variable value set to be lower in accordance with the decrease in the temperature of the magnet. In such a case, even when the drive mode of the vehicle is set to the OD drive mode, the management ECU 119 stops an operation of compensating for the attachment error of each of the resolvers 116m and 116g if the vehicle travels at a vehicle speed higher than the predetermined value in accordance with the temperature of the magnet.

Figure 7:
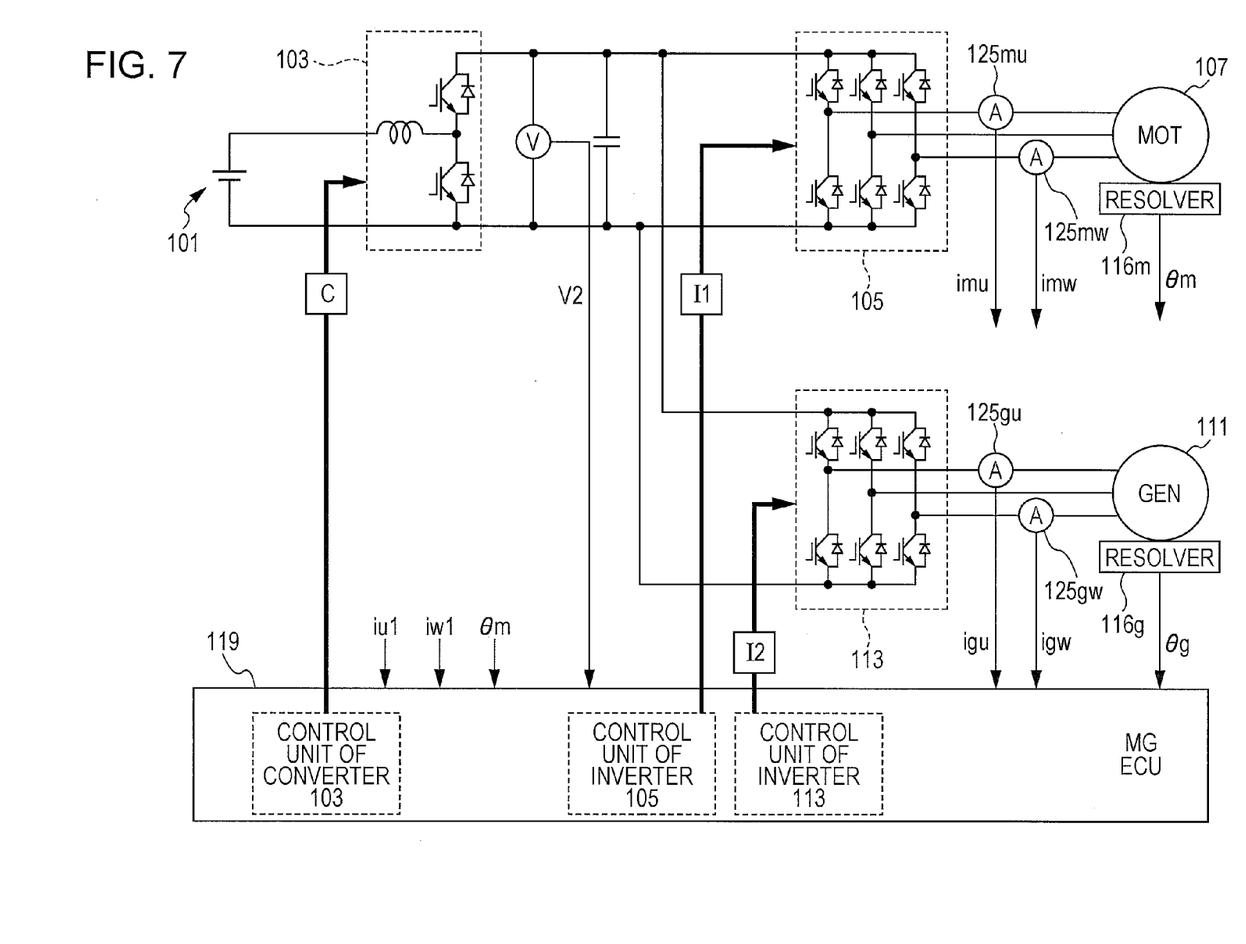
FIG. 7 illustrates the circuit configurations of the converter, a first inverter, and a second inverter and a relationship among the components of the configurations used when the zero current control is performed.
Figure 8:
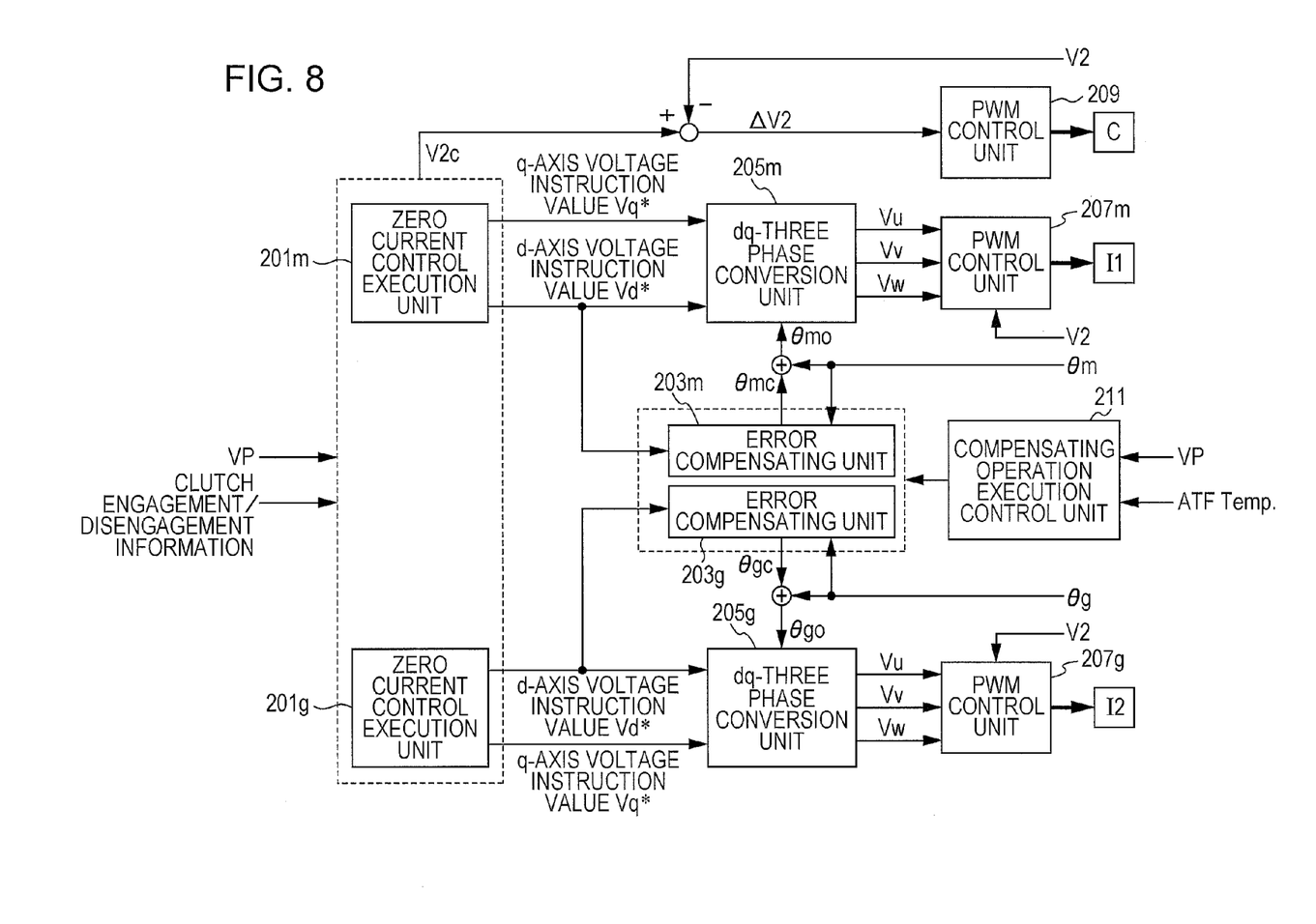
FIG. 8 is a block diagram of the internal configuration of a management ECU.

The management ECU 119 controls the switching operation of each of the transistors that constitute the first inverter 105 and the second inverter 113 on the basis of the d-axis voltage command value Vd* and the q-axis voltage command value Vq* calculated during the zero current control. FIG. 7 illustrates the circuit configurations of the converter 103, the first inverter 105, and the second inverter 113 and the relationship among the components of the configurations used when the zero current control is performed. FIG. 8 is a block diagram of the internal configuration of the management ECU 119.

As illustrated in FIG. 8, the management ECU 119 includes a zero current control execution unit 201m for controlling the first inverter 105, an error compensating unit 203m, a dq-three phase conversion unit 205m, a PWM control unit 207m, a zero current control execution unit 201g for controlling the second inverter 113, an error compensating unit 203g, a dq-three phase conversion unit 205g, a PWM control unit 207g, a PWM control unit 209 for controlling the converter 103, and a compensating operation execution control unit 211.

The zero current control execution unit 201m performs the zero current control so that the electric motor 107 enters a no load condition when the drive mode of the vehicle is set to the OD drive mode. That is, if the zero current control execution unit 201m determines that the clutch 114 is engaged and the vehicle enters the OD drive mode on the basis of the disengagement/engagement instruction for the clutch 114, the zero current control execution unit 201m calculates the d-axis voltage command value Vd* and the q-axis voltage command value Vq* for canceling out the inductive voltage generated in the electric motor 107 on the basis of the vehicle speed VP.

The error compensating unit 203m calculates a correction value θmc used for compensating for the attachment error of the resolver 116m on the basis of the d-axis voltage command value Vd*. By adding the correction value θmc to an electrical degree θm of the rotor of the electric motor 107 detected by the resolver 116m, an electrical degree θmo for which an attachment error of the resolver 116m is compensated can be obtained.

The dq-three phase conversion unit 205m performs dq-three phase conversion on the basis of the d-axis voltage command value Vd*, the q-axis voltage command value Vq*, and the compensated electrical degree θmo of the rotor of the electric motor 107 and calculates command values for three-phase voltages Vu, Vv, and Vw. The PWM control unit 207m performs PWM control of switching the transistors of the first inverter 105 on the basis of the three-phase voltages Vu, Vv, and Vw calculated by the dq-three phase conversion unit 205m.

The zero current control execution unit 201g performs the zero current control so that the generator 111 enters a no load condition when the drive mode of the vehicle is set to the OD drive mode. That is, if the zero current control execution unit 201g determines that the clutch 114 is engaged and the vehicle enters the OD drive mode on the basis of the disengagement/engagement instruction for the clutch 114, the zero current control execution unit 201g calculates the d-axis voltage command value Vd* and the q-axis voltage command value Vq* for canceling out the inductive voltage generated in the generator 111 on the basis of the vehicle speed VP.

The error compensating unit 203g calculates a correction value θgc used for compensating for the attachment error of the resolver 116g on the basis of the d-axis voltage command value Vd*. By adding the correction value θgc to an electrical degree θg of the rotor of the generator 111 detected by the resolver 116g, an electrical degree Ego for which an attachment error of the resolver 116g is compensated can be obtained.

The dq-three phase conversion unit 205g performs dq-three phase conversion on the basis of the d-axis voltage command value Vd*, the q-axis voltage command value Vq*, and the compensated electrical degree Ego of the rotor of the generator 111 and calculates command values for three-phase voltages Vu, Vv, and Vw. The PWM control unit 207g performs PWM control of switching the transistors of the second inverter 113 on the basis of the three-phase voltages Vu, Vv, and Vw calculated by the dq-three phase conversion unit 205g.

The zero current control execution units 201m and 201g described above output an instruction value V2c of the raised voltage so that the converter 103 outputs a substantially constant raised voltage V2 that is higher than the inductive voltage generated in the electric motor 107 or the generator 111. The PWM control unit 209 performs PWM control of switching of transistors of the converter 103 on the basis of a difference ΔV2 between the output voltage V2 of the converter 103 and the instruction value V2c for the raised voltage output from each of the zero current control execution units 201m and 201g.

The compensating operation execution control unit 211 stops the operations performed by the error compensating units 203m and 203g in accordance with the vehicle speed VP. That is, even when the vehicle travels at a travel speed corresponding to the OD drive mode, the compensating operation execution control unit 211 stops the operations performed by the error compensating units 203m and 203g if the vehicle speed is so high that the inductive voltage generated in the electric motor 107 or the generator 111 exceeds the raised voltage upper limit of the converter 103. Note that the above-described predetermined value, which is the upper limit of the vehicle speed for the compensating operation execution control unit 211 to allow the error compensating units 203m and 203g to operate, may be a variable value set to be lower in accordance with the decrease in the temperature of the magnet of the armature of the electric motor 107 or the generator 111. The temperature of the magnet can be obtained from the temperature (ATF Temp.) of lubricating oil of the gear 115, which is also used for decreasing the temperature of the electric motor 107 or the generator 111. In addition, if the temperature of the magnet is lower than the threshold value, the compensating operation execution control unit 211 may stop the operations performed by the error compensating units 203*m* and 203*g*.

Note that the error compensating unit 203*m* may adjust the correction value θmc in accordance with the rotational speed of the electric motor 107 calculated from a variation of the electrical degree θm detected by the resolver 116*m*. Similarly, the error compensating unit 203*g* may adjust the correction value θgc in accordance with the rotational speed of the generator 111 calculated from a variation of the electrical degree θg detected by the resolver 116*g*. Unlike the case in which the rotational speed is small, if the rotational speed of the electric motor 107 or the generator 111 is large, an error occurs between a value recognized by the management ECU 119 and the actual value. The level of the error is determined by, for example, measurement delays of current sensors 125*mu*, 125*mw*, 125*gu*, and 125*gw*, conversion delays of the management ECU 119 for the values detected by the resolvers 116*m* and 116*g*, a phase delay of the voltage applied from the management ECU 119 to the first inverter 105 or the second inverter 113, a computation delay in the management ECU 119, and carrier frequency switching performed by the PWM control units 207*m* and 207*g* illustrated in FIG. 7.

In addition, the zero current control execution units 201*m* and 201*g* may stop the operations thereof in accordance with a braking operation applied to the vehicle. That is, if the brake pedal force (BRK pedal force) is higher than or equal to a threshold value, the zero current control execution units 201*m* and 201*g* may stop the operations thereof. At that time, the braking force can be obtained from the regenerative torque of the electric motor 107 or the generator 111 and the torque of the mechanical brake 118.

As described above, according to the present exemplary embodiment, the converter 103 is controlled so as to output a substantially constant raised voltage that is higher than the inductive voltage generated in the electric motor 107 or the generator 111 when the zero current control is performed in order to compensate for the attachment error of each of the resolvers 116*m* and 116*g*. If the output voltage of the converter 103 is substantially constant, the estimated value of the electrical degree does not vary. In addition, since the raised voltage is higher than the inductive voltage, the zero current control can be performed with the voltage usage ratio less than or equal to 100%. Accordingly, errors in the angles of the resolvers 116*m* and 116*g* with respect to the electric motor 107 and the generator 111, respectively, can be accurately compensated for.

In addition, even when the vehicle travels in the OD drive mode, the operation of compensating for the attachment error of each of the resolvers 116*m* and 116*g* is stopped if the vehicle travels at so high speed that the inductive voltage generated in the electric motor 107 or the generator 111 exceeds the raised voltage upper limit of the converter 103 and, thus, the voltage usage ratio exceeds 100%. In this manner, when the accuracy deteriorates, the compensation is not performed. As a result, the accuracy for compensation of the attachment error of each of the resolvers 116*m* and 116*g* can be increased.

Furthermore, even when the vehicle travels in the OD drive mode, the operation of compensating for the attachment error of each of the resolvers 116*m* and 116*g* is stopped if the temperature of the magnet of the armature of each of the electric motor 107 and the generator 111 is less than a threshold value. In this manner, when the accuracy deteriorates, the compensation is not performed. As a result, the accuracy for compensation of the attachment error of each of the resolvers 116*m* and 116*g* can be increased.

Figure 9:
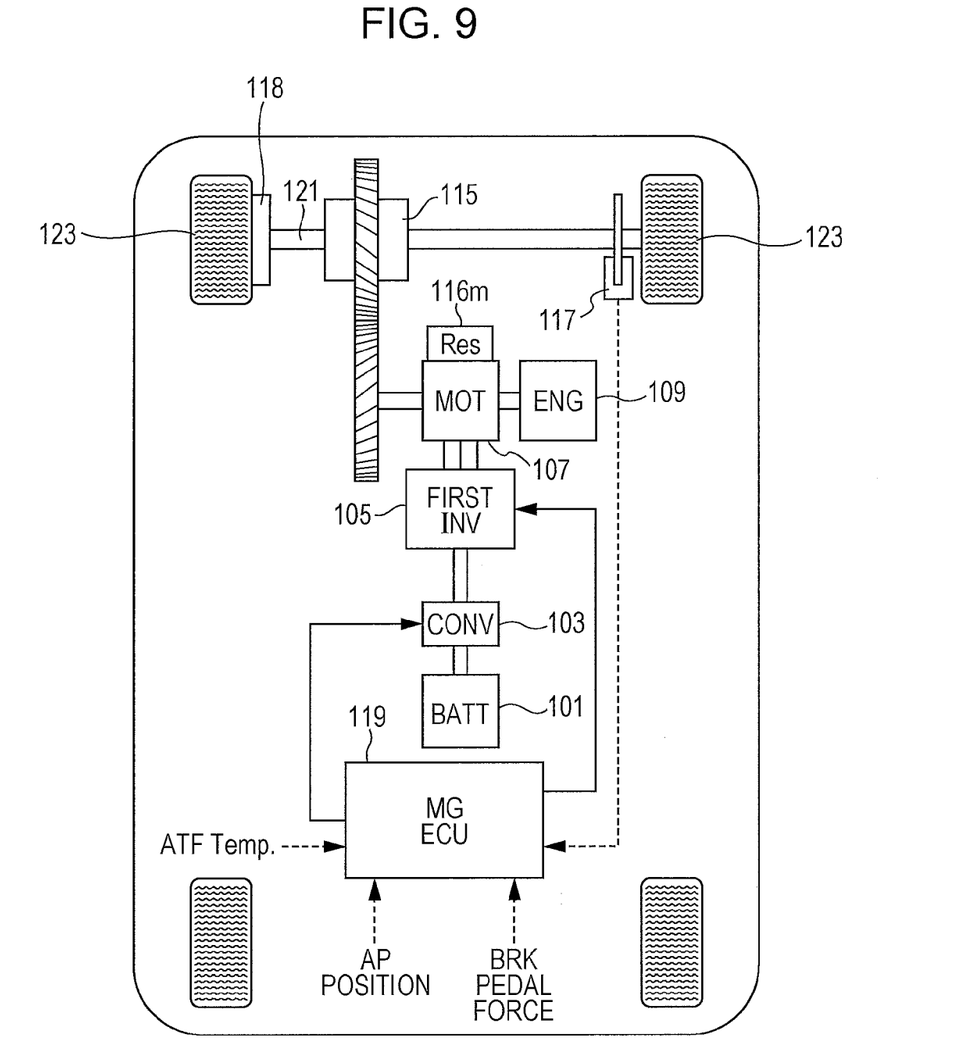
FIG. 9 is a block diagram of the internal configuration of an HEV including the electric motor and the internal-combustion engine having shafts directly connected to each other.
Figure 10:
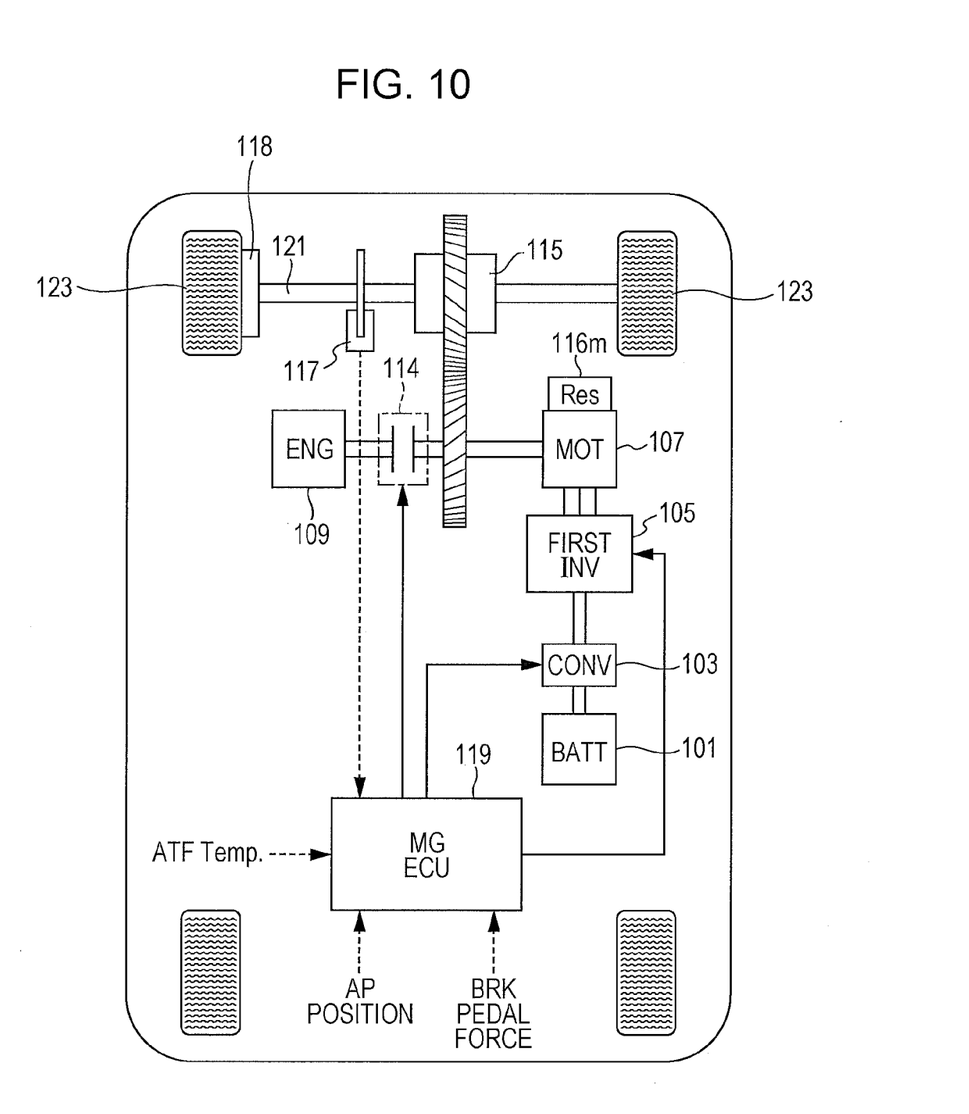
FIG. 10 is a block diagram of the internal configuration of an HEV not including the generator.

While the above-described exemplary embodiment has been described with reference to a series-parallel HEV, the exemplary embodiment is applicable to an HEV including the electric motor 107 and the internal-combustion engine 109 having shafts directly connected to each other illustrated in FIG. 9 and an HEV not including the generator 111 illustrated in FIG. 10.

According to an embodiment of the present application, a load drive control system (e.g., the management ECU 119 according to an exemplary embodiment) for use in a hybrid vehicle is provided. The hybrid vehicle includes an electric motor (e.g., the electric motor 107 according to the exemplary embodiment) configured to serve as a drive source of the hybrid vehicle, an internal-combustion engine (e.g., the internal-combustion engine 109 according to the exemplary embodiment) capable of serving as a drive source, a converter (e.g., the converter 103 according to the exemplary embodiment) configured to raise a DC voltage output from a electricity storage unit (e.g., the electricity storage unit 101 according to the exemplary embodiment) for supplying electricity to the electric motor, an inverter (e.g., the first inverter 105 according to the exemplary embodiment) configured to convert the output voltage of the converter into an AC voltage and apply the AC voltage to the electric motor, and a first position detector (e.g., the resolver 116*m* according to the exemplary embodiment) configured to detect a rotational position of a rotor of the electric motor. The load drive control system includes a zero current control execution unit (e.g., the zero current control execution unit 201*m* or 201*g* according to the exemplary embodiment) configured to perform zero current control so that the rotor of the electric motor is rotated under no load condition when the hybrid vehicle travels by a driving force from only the internal-combustion engine and control the converter so that the converter outputs a substantially constant raised voltage that is higher than an inductive voltage generated in the electric motor and an error compensating unit (e.g., the error compensating unit 203*m* or 203*g* according to the exemplary embodiment) configured to compensate for an attachment error of the first position detector on the basis of a d-axis voltage command value for the electric motor calculated during the zero current control.

The substantially constant raised voltage according to the embodiment can be a raised voltage upper limit of the converter.

In the embodiment, if the inductive voltage generated in the electric motor exceeds the substantially constant raised voltage, an operation performed by the zero current control execution unit can be stopped.

In the embodiment, a condition under which the inductive voltage generated in the electric motor exceeds the raised voltage upper limit of the converter may occur when a vehicle speed of the hybrid vehicle is higher than or equal to a predetermined value.

In the embodiment, a condition under which the inductive voltage generated in the electric motor exceeds the raised voltage upper limit of the converter may occur when a temperature of a magnet that constitutes an armature of the electric motor is less than a threshold value.

The predetermined value according to the embodiment can be a variable value set to be lower with decreasing temperature of a magnet that constitutes an armature of the electric motor.

The zero current control execution unit according to the embodiment can stop the operation thereof in response to a regenerative request caused by a braking operation performed on the hybrid vehicle.

The error compensating unit according to the embodiment can adjust a correction value for the electric motor based on the d-axis voltage command value in accordance with a rotational speed of the electric motor calculated from a result of detection performed by the first position detector.

An output shaft of the internal-combustion engine according to the embodiment can be directly coupled with an output shaft of the electric motor.

The hybrid vehicle according to the embodiment can further include a clutch (e.g., the clutch 114 according to the exemplary embodiment) between an output shaft of the internal-combustion engine and a drive axle of the hybrid vehicle. The electric motor can be disposed closer to the drive axle than the clutch, and the zero current control execution unit can be activated when the clutch is engaged.

The hybrid vehicle according to the embodiment can further include a generator (e.g., the generator 111 according to the exemplary embodiment) configured to supply electricity generated by power of the internal-combustion engine to one of the electric motor and the electricity storage unit and a second position detector (e.g., the resolver 116g according to the exemplary embodiment) configured to detect a rotational position of a rotor of the generator. The zero current control execution unit can perform zero current control so that the rotor of the generator is rotated under no load condition when the hybrid vehicle travels by only the power of the internal-combustion engine and control the converter so that the converter outputs a substantially constant raised voltage that is higher than the inductive voltage generated in the generator. The error compensating unit can compensate for an attachment error of the second position detector on the basis of the d-axis voltage command value for the generator calculated during the zero current control.

According to the load drive control system of the embodiment, an angular error of the position detector that detects the rotational position of the rotor of the electric motor with respect to the rotor can be accurately compensated for.

Obviously, numerous modifications and variations of the present invention are possible in light of the above teachings. It is therefore to be understood that within the scope of the appended claims, the invention may be practiced otherwise than as specifically described herein.

What is claimed is:

1. A load drive control system for a hybrid vehicle, comprising:
    a zero current control execution device configured to perform zero current control in which a rotor of an electric motor which serves as a drive source of the hybrid vehicle is rotated under no load condition if the hybrid vehicle travels using a driving force from only an internal-combustion engine which serves as a drive source of the hybrid vehicle, the hybrid vehicle including a converter and an inverter, the converter being configured to raise a DC voltage output from an electricity storage device configured to supply electricity to the electric motor, the inverter being configured to convert an output voltage of the converter into an AC voltage and to apply the AC voltage to the electric motor, the zero current control execution device being configured to control the converter to output a substantially constant raised voltage that is higher than an inductive voltage generated in the electric motor; and
    an error compensating device configured to compensate for an attachment error of a first position detector based on a d-axis voltage command value for the electric motor calculated during the zero current control, the first position detector being configured to detect a rotational position of the rotor of the electric motor.

2. The load drive control system according to claim 1, wherein the substantially constant raised voltage comprises a raised voltage upper limit of the converter.

3. The load drive control system according to claim 1, wherein, if the inductive voltage generated in the electric motor exceeds the substantially constant raised voltage, an operation performed by the zero current control execution device is stopped.

4. The load drive control system according to claim 3, wherein a condition under which the inductive voltage generated in the electric motor exceeds the raised voltage upper limit of the converter occurs when a vehicle speed of the hybrid vehicle is higher than or equal to a predetermined value.

5. The load drive control system according to claim 4, wherein the predetermined value is a variable value set to be lower in accordance with a decrease in a temperature of a magnet that constitutes an armature of the electric motor.

6. The load drive control system according to claim 3, wherein a condition under which the inductive voltage generated in the electric motor exceeds the raised voltage upper limit of the converter occurs when a temperature of a magnet that constitutes an armature of the electric motor is less than a threshold value.

7. The load drive control system according to claim 1, wherein the zero current control execution device stops an operation thereof in response to a regenerative request caused by a braking operation performed on the hybrid vehicle.

8. The load drive control system according to claim 1, wherein the error compensating device is configured to adjust a correction value for the electric motor based on the d-axis voltage command value in accordance with a rotational speed of the electric motor calculated from a result of detection performed by the first position detector.

9. The load drive control system according to claim 1, wherein an output shaft of the internal-combustion engine is directly coupled with an output shaft of the electric motor.

10. The load drive control system according to claim 1,
    wherein the hybrid vehicle further includes a clutch between an output shaft of the internal-combustion engine and a drive axle of the hybrid vehicle,
    wherein the electric motor is disposed closer to the drive axle than the clutch, and
    wherein the zero current control execution device is activated when the clutch is engaged.

11. The load drive control system according to claim 10,
    wherein the hybrid vehicle further includes
        a generator configured to supply electricity generated by power of the internal-combustion engine to one of the electric motor and the electricity storage device, and
        a second position detector configured to detect a rotational position of a rotor of the generator,
    wherein the zero current control execution device is configured to perform zero current control in which the rotor of the generator is rotated under no load condition when the hybrid vehicle travels using only the power of the internal-combustion engine, the zero current control execution device being configured to control the converter to output a substantially constant raised voltage that is higher than an inductive voltage generated in the generator, and wherein the error compensating device compensates for an attachment error of the second position detector based on a d-axis voltage command value for the generator calculated during the zero current control.

12. A method of controlling a hybrid vehicle, comprising:

performing zero current control in which a rotor of an electric motor which serves as a drive source of the hybrid vehicle is rotated under no load condition if the hybrid vehicle travels using a driving force from only an internal-combustion engine which serves as a drive source of the hybrid vehicle;

controlling the converter to output a substantially constant raised voltage that is higher than an inductive voltage generated in the electric motor; and compensating for an attachment error of a first position detector based on a d-axis voltage command value for the electric motor calculated during the zero current control, the first position detector being configured to detect a rotational position of a rotor of the electric motor.

* * * * *